United States Patent [19]

Whiteford

[11] 4,358,183
[45] Nov. 9, 1982

[54] SOLAR REFLECTING PANEL

[76] Inventor: Carl Whiteford, 3 High Point Rd., Westport, Conn. 06880

[21] Appl. No.: 148,419

[22] Filed: May 9, 1980

[51] Int. Cl.³ .............................................. C02B 5/08
[52] U.S. Cl. .................................... 350/288; 52/222; 126/438; 350/296; 350/310
[58] Field of Search ....................... 350/288, 310, 320; 353/3; 126/438; 52/222

[56] References Cited

U.S. PATENT DOCUMENTS

| | | | |
|---|---|---|---|
| 2,360,500 | 10/1944 | Johnson | 52/222 |
| 3,635,547 | 1/1972 | Rushing et al. | 350/288 |
| 3,687,524 | 8/1972 | Martinez | 350/288 |
| 3,780,477 | 12/1973 | Sprung, Jr. | 52/222 X |
| 3,781,095 | 12/1973 | Rushing et al. | 350/288 X |
| 3,843,238 | 10/1974 | Rushing et al. | 350/288 X |
| 3,880,500 | 4/1975 | Kojabashian | 350/288 X |
| 4,137,687 | 2/1979 | Sprung | 52/222 X |
| 4,209,236 | 1/1980 | Horton et al. | 350/288 X |
| 4,251,135 | 2/1981 | Stone | 350/288 |

Primary Examiner—F. L. Evans
Attorney, Agent, or Firm—Martin D. Wittstein

[57] ABSTRACT

A solar reflecting panel for use with a variety of apparatus for concentrating solar radiation on a close range or distant receiver for producing high temperatures at the receiver in order to commercially utilize the heat energy thereby generated. The solar reflecting panel has a relatively large area, thin, flexible and highly reflective sheet member mounted on a tensioning frame which has an inner frame member capable of withstanding high compressive loads, an outer frame member, and several frame separating devices by which the outer frame member is forcibly urged outwardly relative to the inner frame member. By connecting the sheet reflecting member to the outer frame member, the tensioning frame imposes a high linear tensile strain on the reflecting member so that it is maintained in a substantially planar and highly tensioned condition.

25 Claims, 23 Drawing Figures

SOLAR REFLECTING PANEL

BACKGROUND OF THE INVENTION

It is well known today that there exists a world wide energy crisis as a result of which scientists are constantly seeking new forms of energy, as well as more efficient ways of utilizing known forms of energy. The heart of the energy crisis is, as generally accepted, that presently available sources of energy are dwindling at a rate faster than that at which alternate forms of energy are being made available, in commercially usable form. Solar energy, the heat which is present in the sun's rays, is a virtually inexhaustible supply of energy and, if it could be economically concentrated in large quantities, would completely solve the problem of the dwindling sources of energy which are more readily available. Although there are substantial quantities of fossil fuels such as natural gas, oil and coal, these sources of energy are virtually irreplaceable and will eventually be exhausted. Wind and water energy are abundant and virtually inexhaustible, but are difficult to harness in large quantities. Geothermal energy is still being developed and is not commercially practible as yet, and nuclear energy is obviously fraught with problems too numerous to mention here.

Accordingly, the sun represents a source of energy which is not only vast and inexhaustible, but also, from a purely technical standpoint, one which is very simple to convert from mere "sunshine" into a more usable form of high grade energy. In fact, solar energy is one of the few forms of heat energy which can be utilized to great advantage in its natural form, that is, without converting it to another form. Radiation from the sun is manifested on earth in a variety of forms of energy, the two principal forms being heat and visible light, although there are many types of radiation other than those within the visible spectrum. The heat which is generated on earth from solar radiation is a usable form of energy that can be concentrated and utilized very simply and directly in the form of heat. For example, it has long been known that, if the sun's rays are focused through a magnifying glass or a suitable lens onto a small area or spot, the heat energy generated on that spot is sufficient to cause combustion of certain materials, such as wood or paper. Thus it is well known that, by concentrating the rays of the sun, the high temperature heat thereby generated from the solar radiation can be utilized effectively in that form.

A major obstacle to the efficient commercial utilization of solar energy on a practical basis is that a tremendously large area of solar radiation must be concentrated into a relatively small area in order to produce the high temperatures required to generate practical quantities of heat. The problem, therefore, is to provide a commercially economic way of concentrating the sun's rays over large areas and of redirecting those rays to a location where they are concentrated on a device which can collect and utilize the tremendous amounts of heat which will be generated thereby. Stated differently, the problem is simply one of concentrating a large quantity of "sunshine" so as to generate at one location a sufficiently large quantity of usable high grade heat that the entire effort in terms of cost of hardware and maintenance becomes commercially feasible. This problem has been solved to a large extent by a variety of apparatuses which have the capability of reflecting large quantities of solar radiation and concentrating the radiation on a receiver. One such apparatus, called a heliostat, includes a large reflecting panel, or a plurality of smaller ones, and is capable of appropriate movement so that it can track the relative movement of the sun during the day and generally continuously reflect the rays of the sun to a distant stationary receiver so as to concentrate those rays on the receiver so that a large quantity of heat is generated in a relatively small area. Another such apparatus is called a dish concentrator and is generally structurally and functionally similar to a heliostat except that the dish concentrator typically has a plurality of small reflecting panels which are capable of focusing the rays of the sun on a receiver mounted at relatively close range on the dish concentrator itself. To avoid unnecessary duplication, the panels will be further described in connection with a typical heliostat as illustrative of the environment in which the reflecting panels are used.

Known heliostats generally comprise a large, heavy base anchored into the ground, a large frame mounted on the base which is movable both in azimuth and elevation, and a plurality of large reflecting glass mirror panels mounted on the frame and movable therewith. A typical heliostat might have a reflecting surface measuring 22 feet wide by 24 feet high, and would be made up of 12 individual panels, each 4 feet wide by 11 feet long and constructed of $\frac{1}{4}''$ thick glass with a silver reflective coating on the rear surface of each glass panel. Each panel must be very solidly braced by sufficiently strong structural steel members, in order to provide adequate support for the glass panel, which presents two major problems. One is that glass has a high degree of fragility or a low modulus and must be adequately supported to accommodate constantly varying wind forces. The other is that glass is very brittle and will accept only very small lateral, bending or twisting forces. These factors necessitate the use of very strong bracing, in the absence of which the glass panels would break. In addition, all of the panels must be mounted on the frame so that collectively they form a very slightly concave surface, which will focus all of the sun's rays impinging on the 528 square feet of reflecting area onto a distant receiver, that is relatively quite small in area, and several hundred feet above the ground. It is apparent that such a device, having a glass surface area 22 feet wide and as high as a three story house, must be able to withstand enormous forces from wind, hail, hurricanes, and perhaps even earthquakes. It will also be apparent that the bracing necessary to rigidly maintain the flat, planar configuration of each glass mirror panel and the frame necessary to support all of the panels against their own weight and against external forces, is of a tremendous magnitude, the entire assembly weighing many tons, and therefore very costly to manufacture and assemble. The magnitude of this may be further appreciated by understanding that a single solar energy installation may involve many thousands of such structures located within a 200–500 acre area, all aimed at the same receiver, with consequent total costs for such an installation reaching into the hundreds of millions of dollars.

It can thus be appreciated that a major advantage will have been provided if the cost of each heliostat can be significantly reduced. The utility of heliostats in terms of practical commercial acceptance is measured primarily by the cost per square meter of the reflecting surface, the degree of solar reflectance, its maintainable pointing accuracy and the life expectancy of the unit. Therefore, depending upon the type of construction involved, a particular design of heliostat may or may not be commercially acceptable based on these factors. The lower the cost per square meter of high quality reflective surface, the more a particular design of heliostat can be utilized on a commercial scale.

BRIEF SUMMARY OF THE INVENTION

The present invention relates generally to the field of solar energy and more particularly to solar reflecting panels for use with apparatus for reflecting and concentrating solar radiation on a close range or distant receiver.

The foregoing problems and disadvantages of known heliostats have been greatly obviated and, in some instances, substantially eliminated by the present invention which provides improvements in the solar reflecting panels of known heliostats, which improvements vastly reduce the cost of manufacture, assembly and maintenance over known heliostats. Various other operational advantages are also obtained by the improvements of the present invention, as will be made clear in the general discussion and detailed description of the invention hereinbelow.

Briefly, and in its broader aspects, the principles of the present invention are embodied in a variety of solar reflecting panels adapted for use with various apparatus for concentrating solar radiation on a close range or distant receiver to produce high temperatures thereof, the apparatus being capable of independent movement in both azimuth and elevation so that it reflects the rays of the sun to the receiver. A reflecting panel according to the invention comprises a reflecting member formed as a very thin, relatively large area and relatively flexible sheet of base material, such as stainless steel, and which presents a highly reflective surface to the rays of the sun, the reflective surface being either the surface of the sheet itself or an added layer of specular substance as more fully explained below. The reflecting panel also includes a tensioning frame for supporting the reflecting member, the tensioning frame having means for connecting preselected peripheral portions of the reflecting member to corresponding peripheral portions of the tensioning frame, and means for imposing sufficient stress on the corresponding peripheral portions of the tensioning frame to cause these portions to impose high linear tensile strain on the reflecting member, so that the tensioning frame maintains the reflecting member sheet in a substantially planar and highly tensioned condition.

In one of its more limited aspects, the tensioning frame comprises an outer frame member which is dimensioned to be substantially coextensive with the reflecting member and is formed of a plurality of separate elongate frame member sections, each of which includes suitable means for securely connecting preselected peripheral portions of the reflecting member to corresponding peripheral portions of the outer frame member. There is also an inner frame member disposed within the outer frame member and which has a structural configuration which is capable of withstanding very high compressive stresses directed inwardly relative to the two frame members. Further, the tensioning frame includes a plurality of frame separating devices disposed between the outer and inner frame members at spaced locations around the periphery of the inner frame members for imposing sufficient compressive stresses on the inner frame member to cause the outer frame member sections to be forcibly urged outwardly and thereby to impose the high linear tensile strain on the reflecting member to maintain the reflecting member in the substantially planar, highly tensioned condition.

It should be apparent just from the foregoing that an essential feature of the present invention is the complete elimination of any glass from the reflecting panel used with a heliostat constructed in accordance with the principles of the present invention, and therefore of a unique and novel form of extremely light weight and therefore inexpensive reflecting member and structural support therefor, which nevertheless performs the desired function as well as glass. Since the very thin sheet metal reflecting member is only a small fraction of the weight of a comparably sized sheet of $\frac{1}{4}''$ thick plate glass, and since the tensioning frame requires only a small fraction of the material required for the structural steel bracing which is ordinarily required for adequate support of glass panels, it will be understood that a considerable cost reduction is achieved not only in the cost of manufacture and assembly of the reflecting panels but also in the cost of manufacture and assembly of the supporting structure of the heliostat or dish concentrator for the reflecting panels. The reason for this is that the supporting structure does not have to support as much weight with the reflecting panels of the present invention as with glass panels and also that lateral forces due to wind on the lighter weight panels will cause less strain on the supporting structure. An additional very significant advantage of these reflecting panels is the complete elimination of the problems resulting from broken glass.

In order to use such light weight materials for the reflecting panels, and in order to eliminate strong, rigid bracing such as is needed for glass panels, the reflecting member, i.e. the sheet of base material, must be maintained substantially planar during use. If the reflecting member is not almost perfectly planar, for example, if it is wavy, the rays of the sun will be reflected in random diverse directions rather than being reflected to, and sharply focused on, the distant or short range receiver or target, in which case the reflecting panel loses much of its efficiency and becomes substantially useless. In order to maintain the reflecting member substantially planar, it must be supported only at preselected portions or all of its periphery, so that it is, in effect, suspended in the manner of a drum head and consequently it must be held under high tensile strain so that it is maintained in a highly tensioned condition. The tensioning frame briefly described above, together with the reflecting member mounted thereon, provide a reflecting panel which is highly effective in reflecting and focusing the sun's rays and is extremely light in weight compared to a steel reinforced glass reflecting panel, and yet is itself structurally very rigid and capable of withstanding substantial forces from the wind without permanent deformation.

Other more limited aspects of the present invention include a resilient means interposed between the reflecting member and the tensioning frame for distributing individual high compressive loads from point application to as broad a surface as possible in order to eliminate distortion within the frame members and to prevent rupture of the reflecting member where it is connected to the outer frame member. The resilient means also permits a limited amount of relative movement between the reflecting member and portions of the tensioning frame to accommodate bending forces imposed on the total structure by the wind. Also, the means for imposing stress on the tensioning frame includes means for adjusting the amount of stress so imposed so that the extent of the strain imposed on the reflecting member can be adjusted in order to maintain the tension as uniform as possible around the periphery of the reflecting member. This is necessary in order to compensate for bending of portions of the outer frame member which occurs under high stress loading and which might cause a wavy condition of the reflecting member.

A highly advantageous feature of the present invention is that the reflecting member, held only around its periphery in suspension, can be caused to take on a very slight concavity, either from its own weight due to gravity or by magnetic means when the reflecting panel is almost vertical, so that the reflecting panel will more accurately focus the sun's rays on the receiver. In heliostats with conventional flat glass panels, each panel making up the total reflecting area must be very precisely positioned and locked in place in order to achieve the desired overall effect, which is difficult to do and to maintain.

Although the solar reflecting panels briefly described above and more specifically described hereinafter were conceived and designed for use in the field of commercial utilization of solar energy, particularly in conjunction with solar radiation concentrators, it has since been appreciated that many of the structural arrangements and configurations provided in the solar reflecting panels can be utilized to construct similar panels which have applicability in many other fields which are quite remote from solar energy. For example, panels constructed in accordance with the principles of the present invention can be used in such diverse applications as structural and decorative panels for residential or commercial buildings, facing panels for roadside advertising signs, tilt-up garage doors, lightweight aircraft flooring, outdoor patio roofing and movable wall panels for partitioning business offices, to name several applications which presently appear to be practical for such panels. Further details of the use of these panels in these examplary fields and of such structural changes as may be necessary for such use are set forth below following the detailed description of the several embodiments of the solar reflecting panels.

Having briefly described the general nature and several features of the present invention, it is a principal object thereof to provide an improved solar reflecting panel for use with various solar radiation concentrating apparatuses such as heliostats and dish concentrators which can be manufactured, assembled and maintained at a small fraction of the cost of a comparable sized conventional glass reflecting panel.

It is a more specific object of the present invention to provide a solar reflecting panel which is entirely devoid of glass and consequently does not require heavy structural steel bracing.

It is a further object of the present invention to provide a solar reflecting panel which weighs only a small fraction of comparably sized glass reflecting panels and yet has substantially the same reflective ability and quality as a comparably sized glass reflecting panel.

It is a still further object of the present invention to provide a solar reflecting panel constructed to be a light weight yet relatively strong self-contained unit, in which there is a balance of compressive and tensile forces to maintain a very thin sheet metal reflecting member under high tension.

It is yet another object of the present invention to provide a panel having a highly tensioned sheet covering mounted on a light weight frame for use in various applications.

These and other objects and advantages of the present invention will become more apparent from an understanding of the following detailed description of preferred embodiments of the invention when considered in conjunction with the accompanying drawings in which.

DETAILED DESCRIPTION OF THE INVENTION

Figure 1:
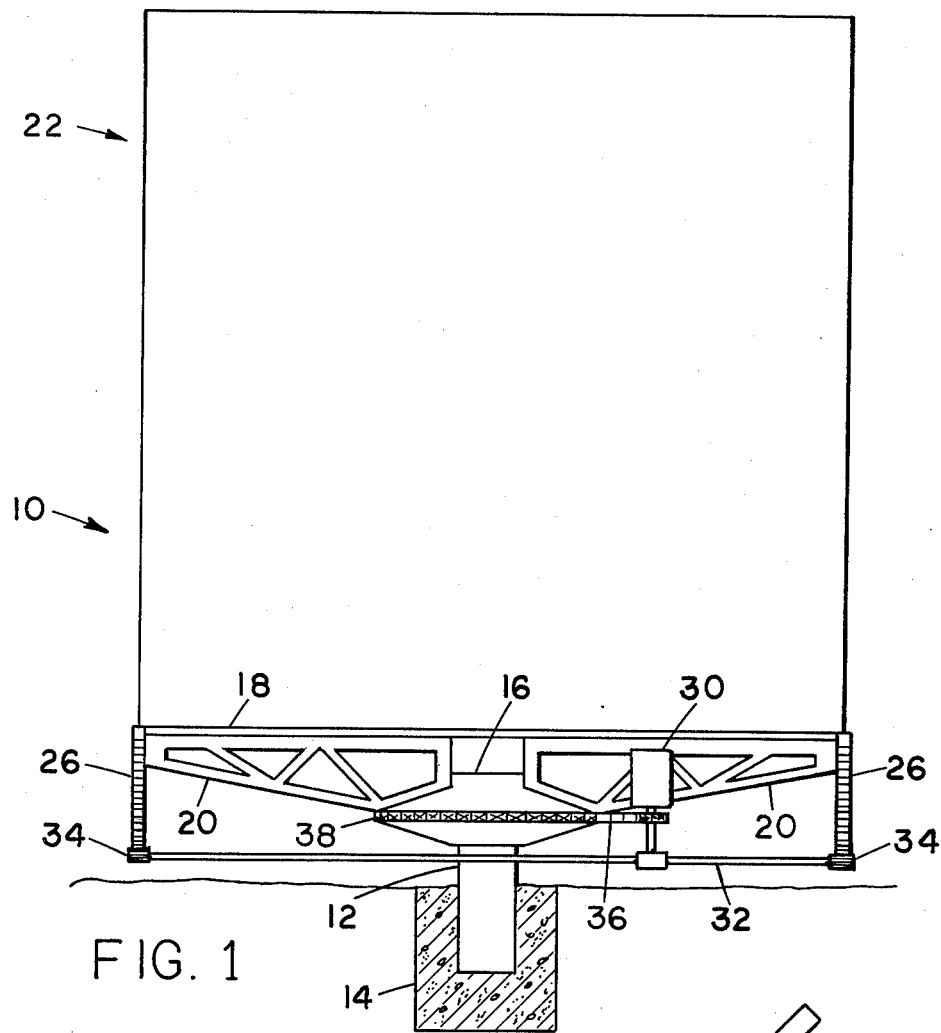
FIG. 1 is a front elevation of a heliostat having a solar reflecting panel constructed in accordance with the principles of the present invention.
Figure 2:
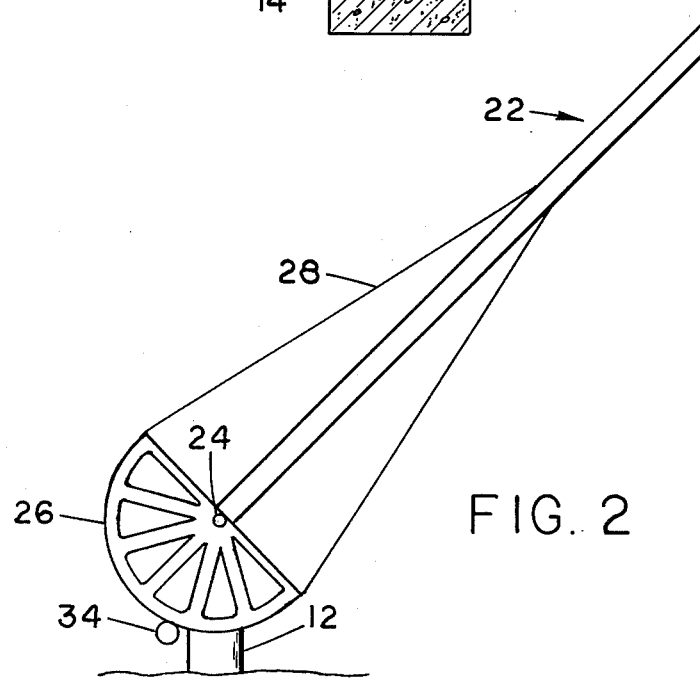
FIG. 2 is a side elevation of the heliostat as shown in FIG. 1.

Referring now to the drawings and particularly to FIGS. 1 and 2 thereof, the reference numeral 10 designates generally a heliostat having a solar reflecting panel constructed in accordance with the principles of the invention. The heliostat 10 includes a base which, for purposes of illustration only, is shown merely as a column 12 which is firmly anchored in the ground such as being embedded in a large block of concrete 14. An elongate cap 16 is rotatably mounted on the top of the column 12 which projects about three to four feet above the ground. A longitudinally extending supporting member such as a suitable beam 18 is rigidly secured to the cap 16 so as to be rotatable therewith. Any suitable form of bracing such as the struts 20 are connected to the beam 18 so that it will not break away from the cap 16 from any lateral force which may be applied.

The heliostat 10 further includes a solar reflecting panel generally designated by the reference numeral 22. Since the present invention is embodied entirely with the solar reflecting panel 22, it will be described in detail below. For the purpose of the present discussion it is only necessary to explain that the reflecting panel 22 is mounted on the beam 18 for rotation therewith and for pivoted movement in elevation relative thereto. This is conveniently accomplished by hinging the reflecting panel 22 to the beam 18 by means of a piano hinge 24 or the like as seen in FIG. 2, so that the reflecting panel can be moved from a horizontal to a vertical position on the beam 18 by means now to be described.

A pair of relatively large sector gears 26 are suitably secured to the bottom edge of the reflecting panel 22 and lie in a vertical plane which is parallel to the vertical plane of the reflecting panel but at right angles to it. These gears may be formed as curved structural members with teeth if desired. Again, in order to provide proper bracing for the reflecting panel with respect to the gear sectors, appropriate guy wires 28 are connected between the outer ends of the gear sectors 26 and an intermediate point on the side edges of the reflecting panel 22.

Any suitable drive means, represented schematically in FIG. 1 by the box 30, is provided to cause both rotation of the cap 16 relative to the column 12 and pivotal elevational movement of the reflecting panel 22 relative to the beam 18. For example, drive means 30 may include one electric motor, suitably mounted on the rotatable beam 18 and connected by shafts 32 to gears 34 which mesh with the sector gears 26 to drive the latter, thereby changing the elevational position of the reflecting panel 22. The drive means 30 may also include another motor mounted with the first motor which drives a chain 36 which passes around stationary sprocket teeth 38 formed on the column 12 so that as the second motor drives the chain 36 in one direction or another, the entire structure from the cap 16 up will be caused to rotate in either direction.

From the foregoing it will be seen that the solar reflecting panel is supported on the base in such manner that it can be moved independently both in azimuth and elevation. This is necessary so that the reflecting panel in effect tracks the course of the sun during the day as the earth rotates, and also takes into account changes in the course of the sun as the orbit of the earth changes. It should be understood that the base, the supporting means and the azimuthal and elevational driving means as thus described form no part of the novelty of the present invention. Since this structure is more or less typical of a heliostat or a dish concentrator with which solar reflecting panels are used.

Figure 3:
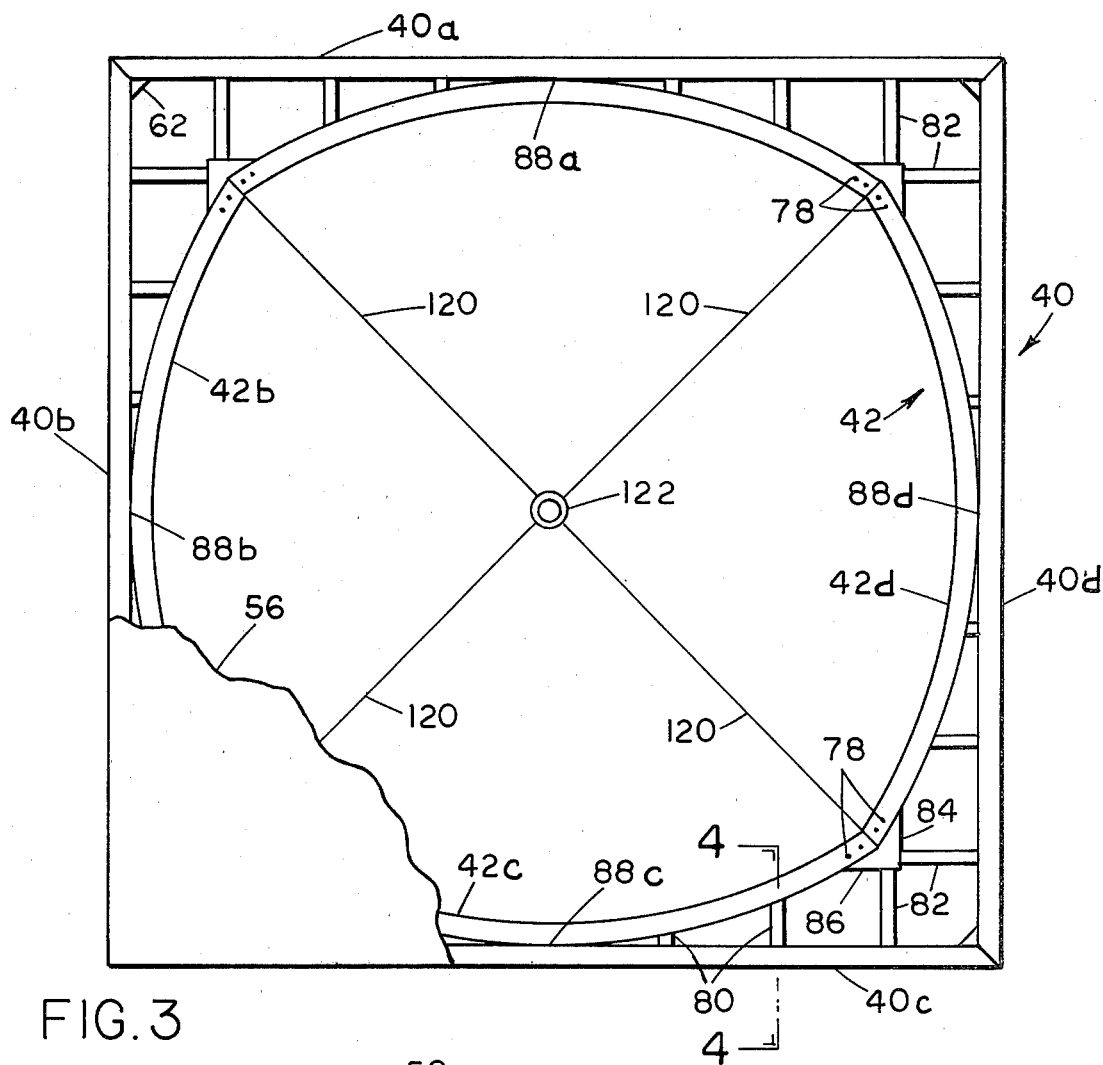
FIG. 3 is a front view of a solar reflecting panel for use with the heliostat shown in FIG. 1 with most of the reflecting member broken away to reveal the details of the tensioning frame.
Figure 3A:
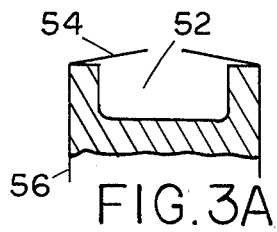
FIGS. 3a, 3b and 3c are enlarged fragmentary views illustrating the manner in which the reflecting member is connected to the outer frame member.
Figure 3B:
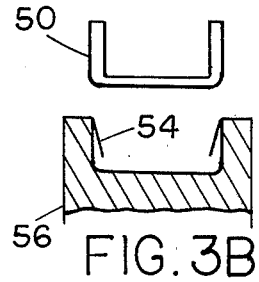
Figure 3C:
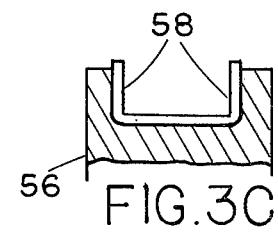
Figure 4:
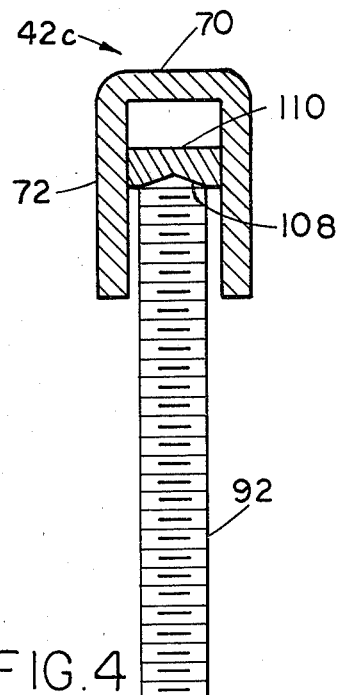
FIG. 4 is an enlarged sectional view taken on the line 4—4 of FIG. 3 showing one of the separating devices provided at spaced locations around the periphery of the inner frame member.

Referring now to FIG. 3, one embodiment of a solar reflecting panel 22 constructed in accordance with the principles of the present invention is seen to comprise a tensioning frame for supporting a reflecting member which is only fragmentarily shown in FIG. 3 in order to show the tensioning frame in solid line format. The tensioning frame comprises an outer square frame member in the illustrated embodiment being made up of four sections 40a, 40b, 40c, and 40d respectively for the outer frame members and 42a, 42b, 42c and 42d respectively for the inner frame members. Although the outer frame member 40 is shown as square, it is not so limited and may be of any desired shape and may therefore include more or less than four sections. Each section of the outer frame member 40, as best seen in FIG. 4, is in the form of an H-beam having a pair of outer legs 44 and a pair of inner legs 46 delineated by the cross member 48, the outer legs 44 being shorter than the inner legs 46 for a purpose to be made clear herein below. A clamping strip 50, in the shape of a rectangular U in cross section, is received within the space 52 defined by the outer legs 44 and the cross member 48, the clamping strip 50 serving to connect preselected peripheral edge portions 54 of a reflecting member 56 to corresponding portions of the outer frame member 40. As shown in FIGS. 3a, 3b and 3c, the peripheral portion 54 of the reflecting member 56 is simply creased and folded to a 90° angle at the inner and outer edges of one of the outer legs 44, and the clamping strip 50 is then forced into the space 52 to securely lock the peripheral portion 54 of the reflecting member 56 therein. It should be noted that the side legs 58 of the clamping member 50 project outwardly slightly beyond the end of the outer legs 44 of the frame member 40 so as to protect the latter and the reflecting member 56 from damage if the reflecting panel 22 is placed on an edge during assembly or other handling. The reflecting member itself may take a variety of forms and will be described in detail hereinbelow.

The four sections 40a, 40b, 40c and 40d of the outer frame member 40 are not directly connected together but rather are maintained in their normal assembled relationship as shown in FIG. 3 by each section 40a, 40b, 40c and 40d being connected to a peripheral edge portion of the reflecting member 56 in the manner just described. This permits the outer frame member sections 40a, 40b, 40c and 40d to be urged outwardly by means described below so that the reflecting member 56 can be pulled linearly in all directions in order to impose a high tensile strain thereon, in the order of 40,000 psi. Stated differently, the reflecting member 56 is being very slightly stretched in all directions in order to render it very taut on the tensioning frame and therefore substantially planar.

Figure 5:
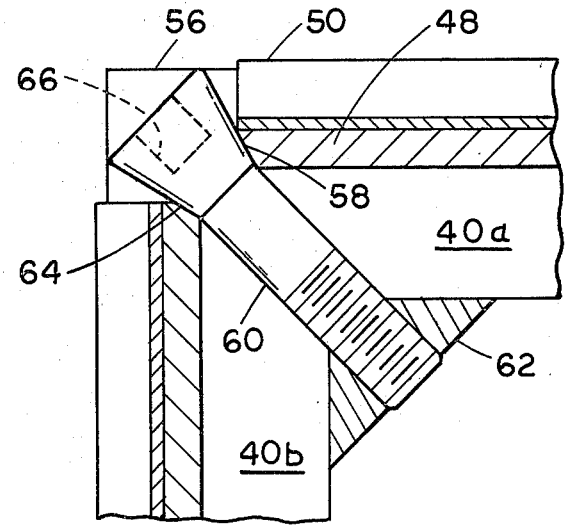
FIG. 5 is an enlarged partly sectional view of one of the separating devices located at the corner junctures of the outer frame member sections.

In order to impose such a high tensile strain on the reflecting member 56, the tensioning frame is provided with a plurality of frame separating devices by which the outer frame member 40 is forcibly urged outwardly with respect to the inner frame member 42, which is constructed to be capable of withstanding very high compressive loading around its periphery. In the embodiment shown in FIG. 3, there are two different types of separating devices which cooperate to produce the desired result, one type being located at the corner junctures of the outer frame member sections and the other type being disposed between the inner and outer frame members at spaced locations around the periphery of the inner frame member. With reference to FIG. 5, it will be seen that the end edges of the frame member sections 40a and 40b are mitred sufficiently so as to form an opening 58 defined by the tapered edges of the cross member 48 of the frame member sections 40a and 40b, the longitudinal axis of this opening being at about a 45° angle (assuming that the juncture is a 90° corner) to the frame member sections 40a and 40b. A bolt 60 is passed through the opening 58 and is threadably engaged with a triangular shaped nut 62 suitably positioned in the inner end of the mitred corner of the frame member sections 40a and 40b. A hexagonally shaped recess 66 is formed in the outer end of the bolt 60 so that it can be rotated by a hexagonal key. Each corner of the outer frame member 40 is constructed in identical manner to that shown in FIG. 5 and described above, assuming that the outer frame member 40 is rectangular. If it is other than rectangular, each juncture of adjacent frame member sections would have a similar separating device. It will now be apparent that as the bolt 60 is rotated in a direction to move the bolt inwardly, the conically tapered head exerts a compressive force down the length of each frame member section 40a and 40b by pushing on the mitred surfaces of the cross member 48 of each frame member section. Since the frame member sections cannot shrink and since this force is being exerted simultaneously on all four corners, the frame member sections must therefore move outwardly away from the center of the tensioning frame, at least near the corners. The result of such movement is that the reflecting member 56, connected as above described to all of the outer frame member sections, is placed under sufficient strain to maintain it highly tensioned, at least near the corners.

With the frame construction thus far described, the reflecting member 56 will not be uniformally tensioned in all directions simultaneously and therefore it may take on a wavy surface pattern rather than being planar. The reason for this is that as the outer frame member sections 40a, 40b, 40c and 40d apply strain to the reflecting member 56, they begin to bend slightly in the middle for lack of support with the result that the reflecting member 56 is not being uniformally tensioned. To counteract this bending effect of the outer frame member sections, another type of frame separating device is provided, a plurality of which are located at spaced intervals between the inner frame member 42 and the outer frame member 40 so that the latter is supported by the former in the manner now to be described.

Figure 6:
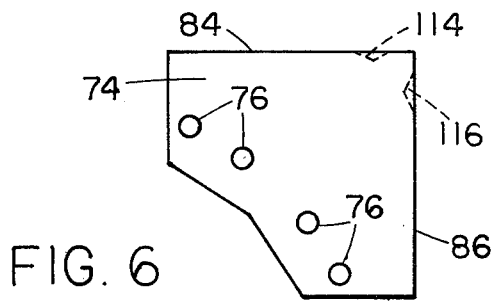
FIG. 6 is a side view of a gusset plate used to connect the inner frame member sections together.

Referring again to FIGS. 3 and 4, each of the inner frame member sections 42a, 42b, 42c and 42d is constructed as a U-shaped channel beam having an inner wall 70 and two side walls 72. It should be noted that the inner frame member 42 is also not limited to four sections, but this number is preferable. Each section is longitudinally curved, and the degree of curvature can range from that which will cause the inner frame member 42 to be circular to any less degree which will conveniently fit within the outer frame member 40, as shown in FIG. 3. The latter configuration is preferred because it saves material and therefy reduces the weight of the overall tensioning frame. Each of the sections 42a, 42b, 42c and 42d are rigidly connected together by means of specially shaped gussets 74 shown in FIG. 6, each of which has four openings 76 which align with similar openings 78 in the slide walls 72 of the inner frame member sections, so that the sections can be bolted or riveted to the gussets 74. Thus, the inner frame member 42 is a rigid construction formed of four arches all connected together and therefore capable of withstanding high compressive forces at any point around the periphery of the inner frame member.

In order to prevent the outer frame member sections 40a, 40b, 40c and 40d from bending as above described, the above mentioned plurality of additional frame separating devices are provided and located between the inner and outer frame members 42 and 40 and function forcibly to urge the outer frame member sections away from the inner frame member sections with varying degrees of force so that the outer frame member sections can be maintained perfectly straight. Thus, with reference to FIG. 3, there is seen a plurality of frame separating devices 80 disposed at spaced apart locations around the periphery of the inner frame member 42 and a pair of frame separating devices 82 located adjacent each corner or or juncture of the outer frame member 40. In addition, there are four locations 88a, 88b, 88c and 88d where the inner and outer frame members 42 and 40 almost contact each other and at which there are additional separating devices. All of these separating devices are substantially identical with the exceptions noted below.

Figure 7:
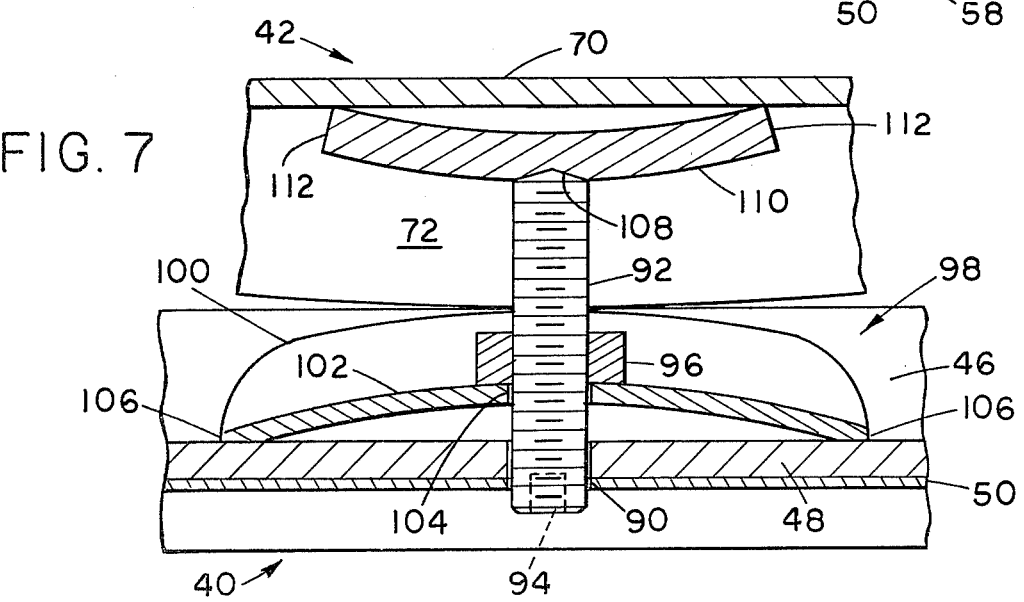
FIG. 7 is an enlarged fragmentary and sectional view of the separating device provided at the locations where the inner and outer frame members almost contact each other.

FIG. 7 shows the separating devices provided at the four locations 88a, 88b, 88c and 88d where the inner and outer frame members 42 and 40 are close together. The cross member 48 is provided with a smooth sided aperture 90 through which passes a threaded set screw 92 having an outwardly facing hexagonally shaped socket 94 by which the screw is turned by means of a suitable tool. The set screw 92 is threadedly engaged with a nut 96 held against rotation by an elongate U-shaped, pre-arched spring member generally designated 98 which has upstanding side walls 100 connected by a central web 102. The web 102 also has a smooth sided opening 104 through which the screw 92 passes. The ends 106 of the spring member 98 bear on the cross-member 48 of the outer frame member sections at spaced apart locations of the purpose of more uniformly distributing the tremendous compressive forces imposed by the structure now being described, so that fewer compressive structural struts are required to support the load. It should be noted that although the pre-arched spring member 98 is shown in FIG. 7 in its arched configuration, in practice in the fully assembled and tensioned reflecting panel the compressive load on the spring member 98 may be sufficient to cause the web 102 to flaten out and lie in contact with the cross-member 48 between the ends 106 of the web 102. It will now be seen that the reason why the inner legs 46 of the outer frame member sections are longer than the outer legs 44 is to accomodate the spring members 98 entirely within the space defined by the legs 46. The inner end of the screw 96 presses into a recess 108 formed into the outer surface of a short pre-arched strip of spring steel 110, the outer ends 112 of which bear against the interior surface of the wall 72 of the inner frame member section 42a, 42b, 42c and 42d as the case may be.

The frame separating devices indicated by the numerals 80 and 82 are identical to the structure just described with the exception that the screws 92 are longer and those designated by the numeral 82 in FIG. 3 bear directly on the outer edge surfaces 84 and 86 of the corner gussets 74, pressing into recesses 114 and 116 formed in the edges 84 and 86 for that purpose.

From the foregoing description, it should now be apparent that as all of the screws 92 are turned in a direction to forcibly urge the outer frame member sections away from the inner frame member sections, large compressive forces will be built up on the inner frame member which are exerted generally radially inwardly from locations spaced around the periphery of the inner frame member 42. The sum of these forces constitutes a compressive load on the inner frame member 42 which it can withstand by virtue of the multiple arch construction as shown and described. Therefore the compressive forces are transferred to the corresponding sections of the outer frame member 40 at the intermediate locations shown in FIG. 3 as 80, 82 and 88. Thus the outer frame member sections 40a, 40b, 40c and 40d are all supported at these locations and are therefore maintained longitudinally straight while being forcibly urged outwardly by the conjoint action of the corner separating bolts 60 and the intermediate separating screws 92. The result of this conjoint action, with the reflection member 56 in place, is that the compressive stress on the inner frame member causes the outer frame member to impose a substantially uniform linear tensile strain on the reflecting member 56 so that the reflecting member is thereby held on the tensioning frame in a substantially planar and highly tensioned condition. It will thus be apparent that the tensioning frame consisting of the outer frame member 40 and the inner frame member 42, together with the reflecting member 56, constitute a reflecting panel 22 in which there is a balance of forces to maintain the reflecting member highly tensioned and substantially planar.

It should be noted that the reason for the pre-arched spring members 98 and 110 is to distribute the individual high compressive loads from the point application of the screws 92 to as broad a surface area as possible in order to eliminate distortion within the frame members and to prevent rupture of the reflecting member where it is connected to the outer frame member. The spring members also permit a limited amount of relative movement between the reflecting member and the inner frame member to accommodate for bending forces imposed by wind on the total structure. The amount of movement permitted by these spring members will allow the frame members to move with respect to each other so that the reflecting member will not be either over or under tensioned as a result of the bending forces.

The reflecting member 56 itself may take a variety of forms. As presently preferred, it is a sheet of stainless steel ranging from about 0.004" to 0.020" and having a highly finished specular surface. If not made of stainless steel, it may or may not be protected against the elements by any of a variety of synthetic varnish or resin base coatings which can be sprayed onto one or both surfaces, or they can be protected by electroplating. In this form the surface will have a reflectance of 65%. If a higher reflectance value is desired, the steel sheet can be coated with a metallic silver layer in the manner of a conventional glass mirror, which will provide a reflectance value of about 95%. With such a coating it would be necessary to apply some form of protective coating for the silver metallic layer since it would be susceptable to deterioration from airborne elements, such as oxygen and sulphides. Other suitable known forms of metal or metal based materials with suitable specular surface properties are deemed to be within the scope of this invention, as well as other forms of protective coatings such as polycarbonate resins which can be added adhesively to the metal sheet with a high reflective coating sandwiched between the plastic coating and the metal sheet.

A feature of the present invention not yet mentioned is the means by which a bending moment in the tensioning frame is overcome. The bending moment in the frame is caused by the strain, which is imposed on the reflecting member 56 by the outer frame member 40, reacting on only one side of the outer frame member 40, thereby tending to bend the outer frame member 40, and to some extent the inner frame member 42, out of its normal plane. In the preferred embodiment of the invention, this bending effect is overcome by providing means on the opposite side of the tensioning frame for applying a bending force equal and opposite to that applied by the reflecting member, such as a second sheet of metal on the opposite side of the tensioning frame from the reflecting member 56. Whether this second sheet of metal has a reflecting surface is not of importance so long as the second sheet of metal is otherwise identical to the reflecting member in such characteristics as composition, thickness, weight, thermal expansion and tensile strength so that it will have the same force reactions in the system as the reflecting member 56. With both metal sheets in place, the entire reflecting panel 22 is perfectly balanced not only linearally in any direction but also in transverse directions as well.

A further feature of the present invention not yet mentioned is seen in FIG. 3. A plurality of cables 120 are each suitably connected to the joints between the four inner frame member sections and to a ring magnet 122 located at the geometric center of the tensioning frame. The magnet is thinner than the width of the inner frame member 42, which in turn is thinner than the outer frame member 40, so that the reflecting member 56 and the second steel sheet do not touch the inner frame member under normal conditions. The magnet attracts both the reflecting member 56 and the second steel sheet toward each other with the result that the reflecting member 56 is given the very slight degree of concavity which is required to properly focus the rays of the sun on its target, or at least to assure that the rays are not reflected in a divergent manner. Thus, the reflecting member is provided with this adjustable concavity even when it is vertical, in which position it would not have the concavity due to slight sag from its own weight as it would in an angled or more horizontal attitude. The magnet also serves to eliminate vibratory oscillations due to the wind, especially in the more central area of the large reflecting member. The vibratory oscillations will be strongly dampened by a strong magnet since it effectively ties the front and back tensioned members together into one unit whereby each already tensioned sheet is slightly additionally tensioned so that the two opposed slightly concave planar surfaces help each from oscillating.

Figure 8:
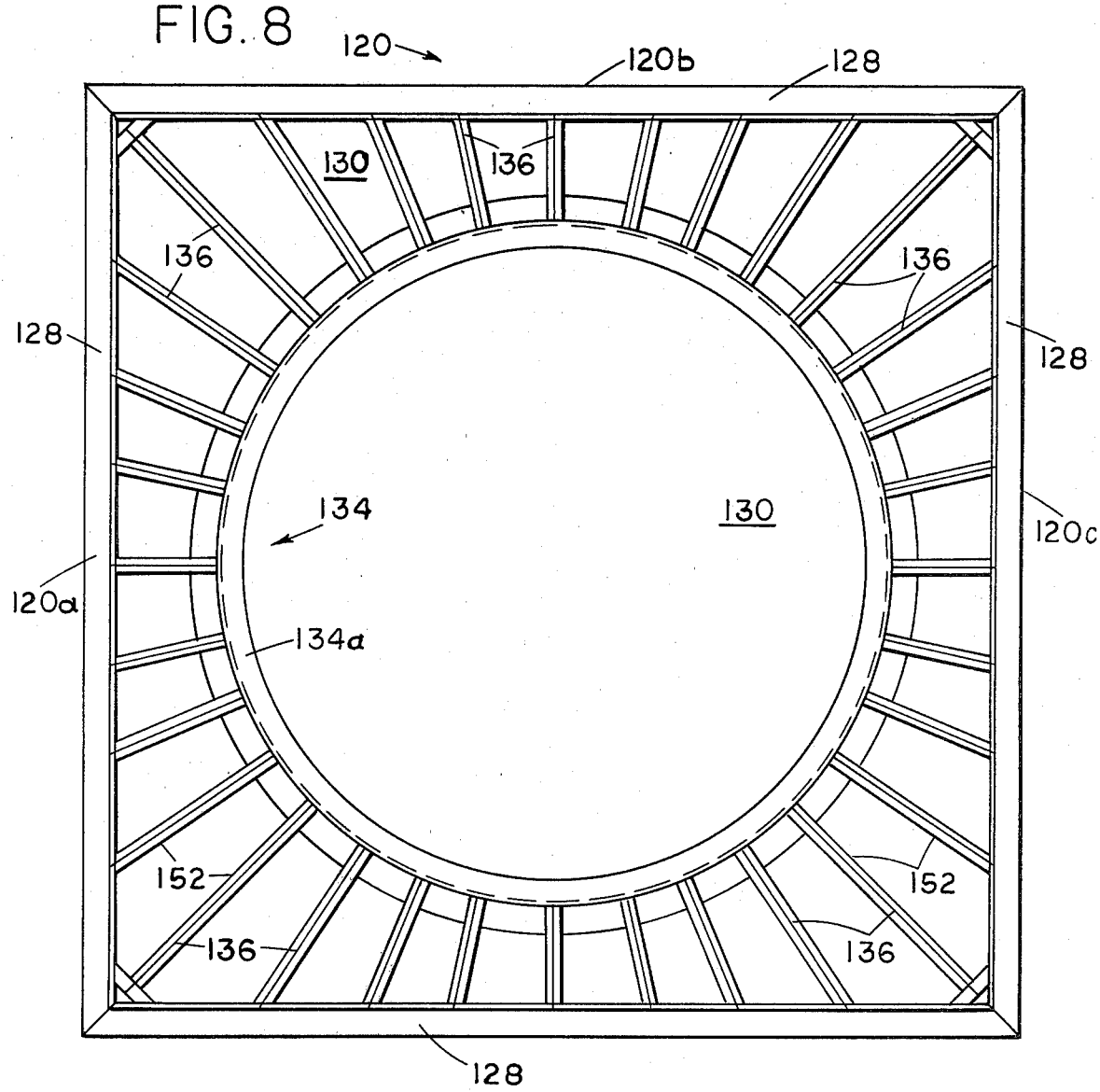
FIG. 8 is a rear view of another embodiment of solar reflecting panel for use with the heliostat shown in FIG. 1.
Figure 13:
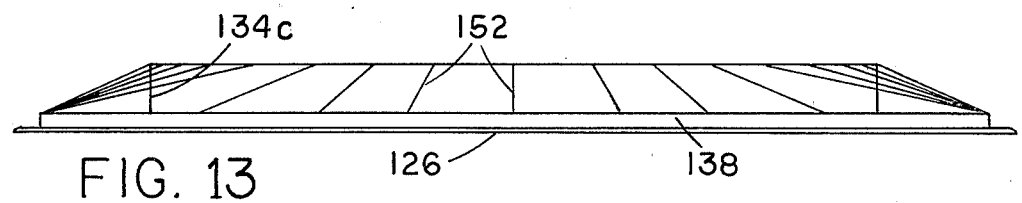
FIG. 13 is a side view of the solar reflecting panel shown in FIG. 8.
Figure 11:
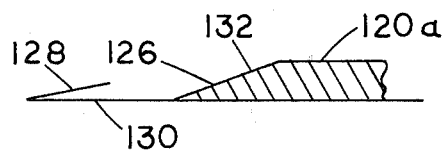
FIGS. 11 and 12 are fragmentary, enlarged sectional views showing how the reflecting member is connected to the outer frame member in this embodiment.

In another embodiment of the invention illustrated in FIGS. 8 through 13, the solar reflecting panel comprises an outer frame member generally designated by the numeral 120 and in the illustrated embodiment shown in FIG. 8, is square, of which three sides 120a, 120b, and 120c are shown, although the frame may be rectangular. Each side 120a, 120b and 120c is an outer frame member section, and all of the sections, regardless of the number, are rigidly inter-connected together.

Figure 12:
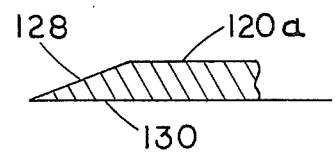
Figure 10:
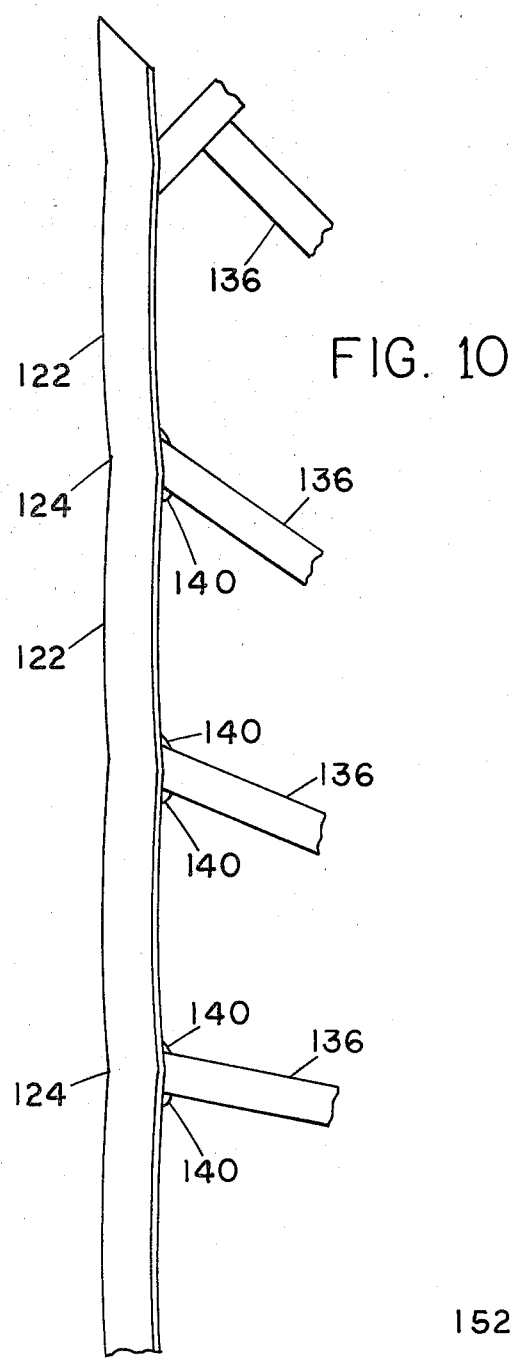
FIG. 10 is a fragmentary enlarged view of a portion of the outer frame.
Figure 9:
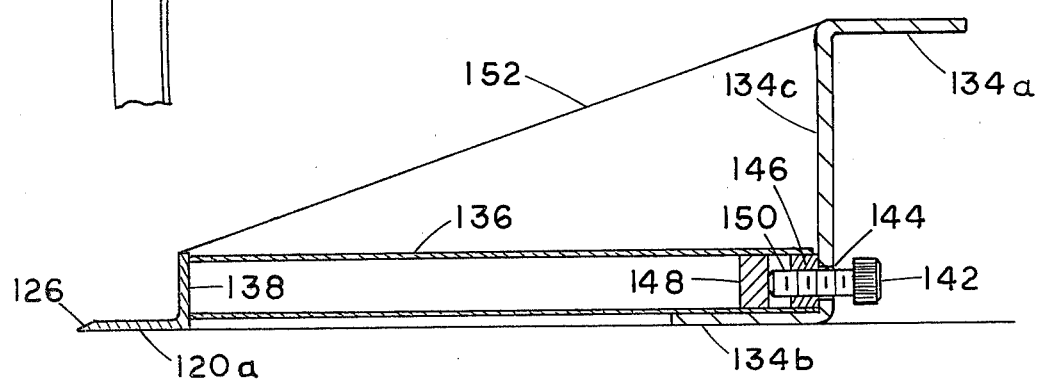
FIG. 9 is an enlarged sectional view taken on the line 9—9 of FIG. 8 showing one of the separating devices provided at spaced locations around the periphery of the inner frame member.
Figure 14:
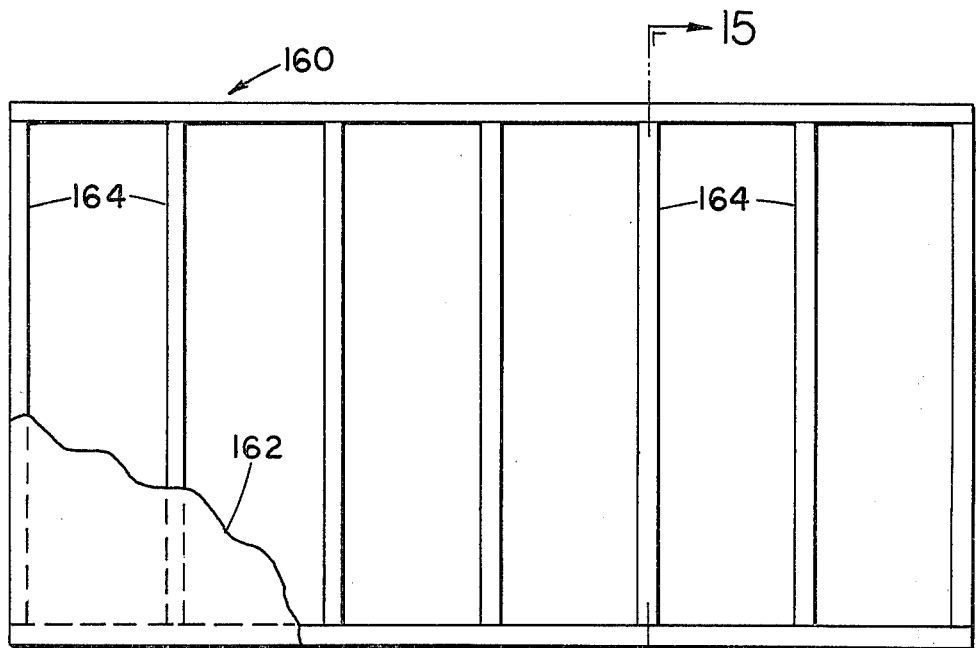
FIG. 14 is a front view of another embodiment of a solar reflecting panel used with a dish concentrator with most of the reflecting member broken away.

Each outer frame member section is formed as an L-shaped angle beam as best seen in FIG. 9, and has a slightly scalloped configuration along its length, as best seen in FIG. 10. Thus, each outer frame member section is formed to have protrusions 122 and depressions 124 in both legs of the angle beam for a purpose to be described below. The outer edge 126 is formed as a tapered edge, as shown in large section in FIG. 11, so that a peripheral portion 128 of a reflecting member 130 can be bent over an angle corresponding to the angle of the tapered position 132 of the angle beam which forms the tapered edge 126 thereby holding the reflecting member in place around the periphery of the outer frame member 120 as seen in FIG. 12.

The tensioning frame further includes an inner frame member generally designated by the numeral 134 and which comprises a channel beam which can be U shaped or the Z shape as shown in FIG. 9 having the two end legs 134a and 134b connected by the intermediate leg 134c. The channel beam as a shole is shown as round when viewed in plan but it may have other configurations and may be fabricated as a solid piece or as sections which are field assembled.

Between the two frames are a plurality of struts 136, which may extend radialy as shown or in parallel in groups if the inner frame member has a configuration in which it is concentric with the outer frame member and therefore would have flat sides. The struts 136 are preferably formed as square hollow sections, the outer ends of which are fixidly secured to the inner face 138 of the upstanding leg of the angle beam 120 such as by being welded thereto; the welds are indicated in FIG. 10 by the numeral 140. It will be noted that the struts 136 are secured to the angle beam section 120a at the locations of the depressions 124.

The inner end of each strut 136 is connected to the inner frame member section, as seen in FIG. 9, by means of a bolt 142 which passes through an aperture 144 in the intermediate leg 134c of the inner frame member and is threadedly engaged with a nut 146 suitably held against rotation in the inner end of the strut 136. The bolt 142 is adapted to press against an abutment member 148 which is welded or otherwise suitable secured to the strut 136. Thus, the bolt 142 is turned in a tightening direction in the nut 146, the end 150 of the bolt pushes on the abutment member 148 and forces the strut outwardly toward the outer frame member 120.

From the foregoing description, it will be seen that the tightening of all of the bolts 142 around the periphery of the inner frame member will tend to force the outer frame member sections outwardly which in turn will impose a high linear strain of the reflecting member 130. Because of the scalloped shape of the outer frame member 120, the tensioning force on the reflecting member is first imposed at the locations of the protrusions 122 since these are in contact with the reflecting member 130,, whereas the depressions 124 are not initially in contact with the reflecting member. However, as more force is applied to the outer frame member 120 by further tightening of the bolts 142, the outer frame member begins to straighten and the depressions 124 come into contact with the reflecting member 130, and when the force exerted by the outer frame member at the locations of the depressions 124 is equal to that at the locations of the protrusions 122, the outer frame member is then uniformly pulling on the reflecting member 130 with substantially the maximum force designed for. Thus, in this embodiment of the invention, the scalloped configuration of the outer frame member is, in effect, the resilient means for distributing the load on the reflecting member as much as possible.

In this embodiment of the invention, the bending moment, discussed in detail in connection with the preceeding embodiment, is overcome by means of the guy wires 152 which are suitably connected between the outer end of each strut and the outer edge of the leg 134a of the inner frame member 134. Thus, as the struts 136 are pushed outwardly, the guy wires are placed under additional tension to offset the bending moment in the tensioning frame caused by the high tension in the reflecting member 130.

FIGS. 14 through 20 illustrate still another embodiment of the invention which is directed toward a solar reflecting panel more particularly designed for use with a dish concentrator rather than with a heliostat. The reason for this is that the panel of this embodiment is generally rectangular, is much smaller than the panels used with a heliostat, and is substantially planar and tensioned in one linear direction but is curved in the other linear direction at right angles to the first linear direction, with the result that the panel can focus the rays of the sun on a much closer target than the type of panel used with a heliostat. Generally, a panel designed for use with a dish concentrator would be about four feet wide by eight feet long, and approximately six to eight such panels would be mounted on a single concentrator unit.

With reference to FIGS. 14 through 20, it will be seen that the panel shown therein differs significantly from the panels described above in that the tensioning frame does not have inner and outer frame members connected by expansion devices. Rather there is a single tensioning frame generally designated by the reference numeral 160 which comprises a pair of parallel frame member 160a and 160b which are formed as U-shaped channel sections as seen in cross section in FIG. 15. These frame members are maintained in operative relationship by the joint action of a reflecting member 162 which is connected to the frame members 160a and 160b and a plurality of struts 164 which include separating devices for pushing the frame members 160a and 160b away from each other against the resistance of the reflecting member 162 whereby the reflecting member is tensioned.

Thus, the reflecting member 162, is, as in the previously described embodiments, a sheet of stainless steel or other suitable material, the longitudinal edge position 166 of which is bent over into the outwardly facing recess 168 of each frame member 160a and 160b. A retaining channel member 170 is then inserted into the recesses 168 to securely connect the edge position 166 of the reflecting member 162 to the frame members 160a and 160b. This means of connecting the reflecting member 162 to the frame members 160a and 160b is similar to that shown and described in connection with the embodiment of FIGS. 3 through 7.

Figure 16:
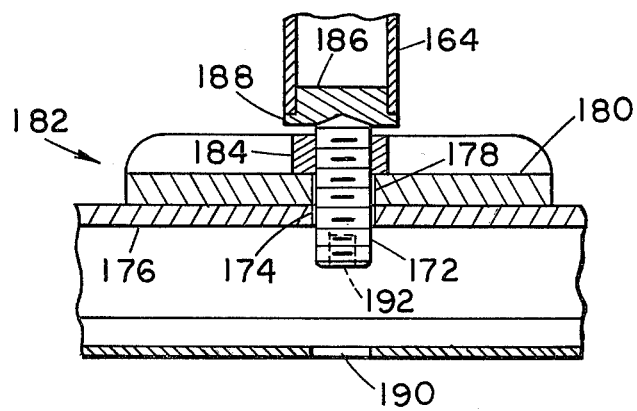
FIG. 16 is an enlarged sectional view through a frame member section where it meets one end of a strut showing one of the separating devices interposed between the frame member sections and each end of the struts.

With reference to FIG. 16, it will be seen that each strut 164 is connected to the frame members 160a and 160b by a resilient expansion means having some similarities to that shown in FIG. 7. The expansion means comprises a set screw 172 which is received in an unthreaded aperture 174 formed in the bottom or inner wall 176 of each frame member 160a and 160b. The set screw 172 passes through another unthreaded aperture 178 formed in the bottom wall 180 of a U-shaped spring member generally designated by the numeral 182 and is then secured to a nut 184 which is suitably secured to, or is merely held against rotation by, the spring member 182. The inner end of the set screw 172 abuts against a plug 186 inserted into the end of the strut 164, the plug 186 having a flange 188 which prevents the plung 186 from moving further into the hollow strut 164. The channel shaped connecting member 170 is provided with an aperture 190 through which a suitable tool is inserted to engage the recess 192 in the set screw to turn the latter.

It will be understood from the foregoing that as all of the set screws are tightened into the nuts 184 at the opposite ends of each strut 164, the frame member sections 160a and 160b are pushed away from each other with great force, thereby, placing the reflecting member under high tension and pulling it into a planar configuration. The set screws are rotated until the bottom wall 180 of the spring member 182 lies substantially flat on the inner wall 176 of the frame member sections, the spring member having been curved in its unstressed condition similar to the spring member 98 seen in FIG. 7. At that point substantially the maximum compressive force will have been applied to the struts 164, and the spring members 182 will be distributing the load uniformly over the length of the frame member section covered by the spring member 182.

Figure 17:
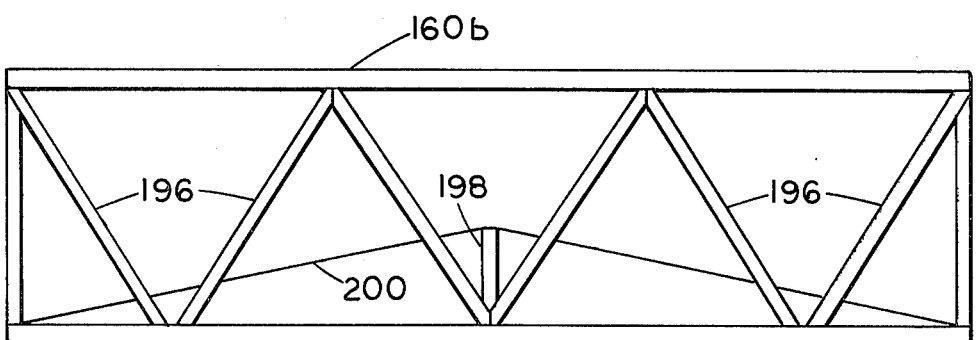
FIG. 17 is a side view of the solar reflecting panel shown in FIG. 14 with the panel being stressed only in a lateral direction.
Figure 19:
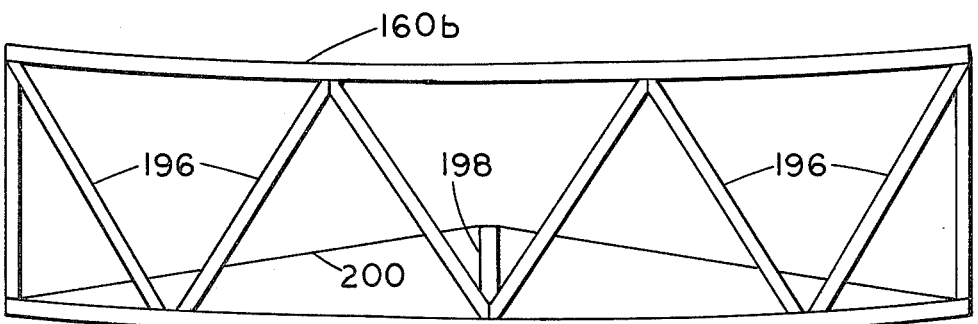
FIG. 19 is a view similar to FIG. 17 but showing the panel as slightly curved in a longitudinal direction while stressed in a lateral direction.
Figure 18:
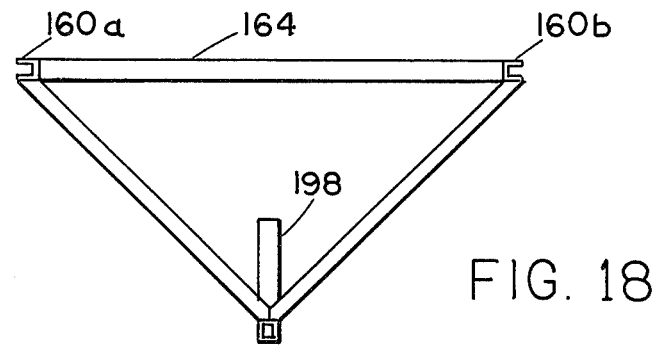
FIG. 18 is an end view of the panel shown in FIG. 17.
Figure 15:
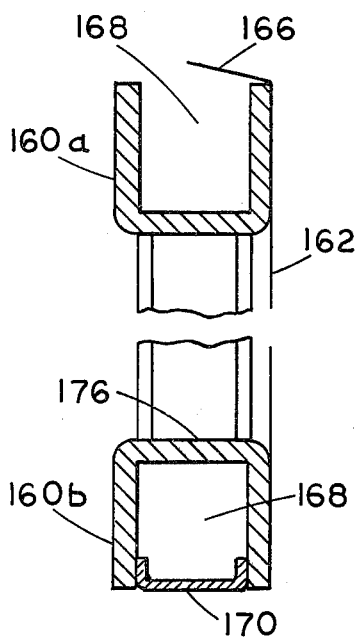
FIG. 15 is an enlarged sectional view through one of the connecting struts taken on the line 15—15 of FIG. 14.
Figure 20:
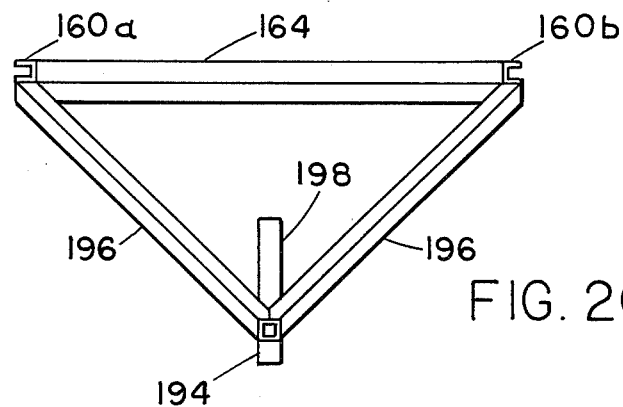
FIG. 20 is an end view of the panel shown in FIG. 19.

As briefly indicated above, the reflecting panel in this embodiment of the invention is intended to have a small degree of curvature in one direction and be planar in the other direction. The reason is that this panel is intended for use principally in a dish concentrator where the cavity receiver is located at a relatively close range to the reflecting panel. Thus, FIG. 17 shows a side view of the reflecting panel as it would appear before being curved and FIG. 18 show an end view of the same panel. The frame member sections 160a and 160b and the struts 164 are suitably mounted as a unit on a triangular shaped frame comprising a centrally disposed longitudinal beam 194 and a plurality of laterally extruding struts 196 which are suitably connected at one end to the beam 194 and at the other end to the frame member sections 160a and 160b. A tubular steel compression member 198 is connected to the beam 194 at the center thereof, and a guy wire or tensionable cable 200 is connected to the ends of the beam 194 and passes over the free end of the compression member 198. It will be apparent that, as the guy wire 200 is shortened by any suitable means (such as by interposing one or more conventional turnbuckles), the ends of the beam 194 will be pulled upwardly thereby creating the slight curvature in the beam 194 shown in FIGS. 19 and 20. This in turn causes the tensioning frame 160 to take on a corresponding curvature as seen in these figures, with the result that the reflecting member 162 remains planar between the two frame member sections 160a and 160b, but is curved longitudinally between the two end struts 164. With this arrangement all of the sun's rays impinging on the panel can be focused into the cavity receiver mounted on the dish concentrator.

As briefly explained in an early portion of this specification the principles of construction of the solar reflecting panels can be utilized to construct a variety of panels for use in many diverse fields which have no relation to the solar energy field. As stated above, the principles of this invention were conceived and developed for a panel to be used as a light weight reflecting panel to replace glass mirrors which have been the standard reflecting means prior to this invention. However, it has been appreciated that the panels described above, or others of such similar construction as to fall within the scope of the claims hereinafter set forth, can be used, either in identical form or with certain modifications mentioned below, for many other purposes.

With sharply increasing material prices, building designers have begun to seek alternate forms of very strong but light weight construction rather than the more traditional heavy steel beam construction. Obviously if the same strength can be achieved with less material, the final construction cost of a building will be substantially reduced.

Roadside advertising signs are another example of inefficient use of expensive materials. Typically formed of sheets of plywood secured to a metal framework capable of withstanding several lateral forces due to wind, plywood being both a heavy and expensive material, substantial cost reduction could be achieved by constructing the sign by utilizing one of the foregoing panel designs.

In large jet aircraft, material weight is a major source of concern, since every pound of material weight saved without loss of strength or rigidity is an additional pound of payload. It would seem practical to use the panel construction, perhaps with some transverse bracing, as flooring panels of the aircraft cabin.

Other uses such as garage door panels, roofing panels, etc., are believed to be apparent and need not be individually explained.

With respect to any changes or modifications which would be made to the above described solar reflecting panels to render them applicable for use in other fields, probably the most apparent change is the elimination of the highly specular surface on the sheet of base material. A panel designed for any of the above noted purposes need not have a reflective surface, at least not a highly reflective surface such as would be required for silver plating. A decorative building panel might be provided with a polished surface, but a roofing panel or a flooring panel which will be covered with carpeting could employ a base material sheet having an unpolished surface texture.

In some situations where the panel is intended to be used in a horizontal position and must support a load, such as for flooring or roofing, it may be necessary to provide additional supporting members within the inner frame member in order to prevent undue bending or excessive strain in the sheet of base material. These additional supporting members can be provided as a plurality of parallel or radial struts and may be secured to the inner frame member by any suitable means. Since the high tension on the sheet of base material would still provide a very substantial proportion of the load supporting capability of the panel, additional supporting strus could be kept to a minimum.

I claim:

1. A solar reflecting panel adapted for use with various apparatus for concentrating solar radiation on a close range or distant receiver to produce high temperatures thereat, the apparatus having means for supporting said solar reflecting panel and for moving it independently in both azimuth and elevation so that it reflects the rays of the sun to the receiver, said solar reflecting panel comprising:

A. a reflecting member formed as a very thin, relatively large area and relatively flexible sheet of base material, said reflecting member presenting a highly specular surface to the rays of the sun, and B. a tensioning frame for supporting said reflecting member, said tensioning frame having
1. an outer frame member which is dimensioned to be substantially coextensive with the peripheral portion of said reflecting member and to which said reflecting member is connected,
2. an inner frame member capable of withstanding high compressive stress directed generally radially inwardly,
3. means for connecting preselected peripheral portions of said reflecting member to corresponding peripheral portions of said tensioning frame, and
4. means for imposing sufficient stress on said corresponding peripheral portions of said tensioning frame to cause said portions of said tensioning frame to impose high linear tensile strain on said reflecting member so that said tensioning frame maintains said reflecting member in a substantially planar and highly tensioned condition, said means comprising means for forcibly urging said outer frame member away from said inner frame member against the resistance of said reflecting member whereby said reflecting member is placed in said substantially planar and highly tensioned condition.

2. A solar reflecting panel as set forth in claim 1 wherein said means for forcibly urging said outer frame member away from said inner frame member includes means for adjusting the amount of the stress imposed on said outer frame member whereby the amount of tensile strain imposed on said reflecting member by said tensioning frame can be adjusted.

3. A solar reflecting panel as set forth in claim 1 wherein said means for imposing said stress on said portions of said tensioning frame includes resilient means interposed between said reflecting member and said inner frame member to permit limited relative movement between said reflecting member and said inner frame member resulting from bending forces imposed on said reflecting panel.

4. A solar reflecting panel as set forth in claim 1 wherein said means for forcibly urging said outer frame member away from said inner frame member comprises frame separating devices disposed in spaced apart relationship around the periphery of said inner frame member and interposed between said inner and outer frame members.

5. A solar reflecting panel as set forth in claim 4 wherein said frame separating devices include resilient means interposed between said inner and outer frame members to permit limited relative movement between said inner and outer frame members resulting from bending forces imposed on said reflecting panel.

6. A solar reflecting panel as set forth in claim 1 wherein said outer frame member comprises a plurality of elongate frame member sections to which said reflecting member is connected, and wherein said means for forcibly urging said outer frame member away from said inner frame member comprises frame separating devices located at the corner junctures of said outer frame member sections.

7. A solar reflecting panel as set forth in claim 6 wherein said means for forcibly urging said outer frame member away from said inner frame member further includes frame separating devices disposed in spaced apart relationship around the periphery of said inner frame member and interposed between said inner and outer frame members.

8. A solar reflecting panel as set forth in claim 1 wherein said outer frame member has an outwardly facing recess around the periphery thereof, and said reflecting member is connected to said outer frame member by a peripheral edge portion of said reflecting member being folded over and pressed into said outwardly facing recess, and further including means disposed in said recess for forcibly holding said peripheral edge portion of said reflecting member therein.

9. A solar reflecting panel adapted for use with various apparatus for concentrating solar radiation on a close range or distant receiver to produce high temperatures thereat, the apparatus having means for supporting said solar reflecting panel and for moving it independently in both azimuth and elevation so that it reflects the rays of the sun to the receiver, said solar reflecting panel comprising:
A. a reflecting member formed as a very thin, relatively large area and relatively flexible sheet of base material, said reflecting member presenting a highly specular surface to the rays of the sun, and
B. a tensioning frame for supporting said reflecting member, said tensioning frame comprising
1. an outer frame member which is dimensioned to be substantially coextensive with said reflecting member, said outer frame member being formed of a plurality of elongate frame member sections, each section having means for connecting peripheral portions of said reflecting member to corresponding peripheral portions of said outer frame member,
2. an inner frame member disposed within said outer frame member and having a structural configuration such that said inner frame member is capable of withstanding high compressive stresses directed inwardly relative to said inner and outer frame members, and
3. a plurality of frame separating devices disposed between said inner and outer frame members at spaced locations around the periphery of said inner frame member for imposing sufficient compressive stress on said inner frame member to cause said outer frame member sections to be forcibly urged outwardly and thereby to impose high linear tensile strain on said reflecting member so that said tensioning frame maintains said reflecting member in a substantially planar and highly tensioned condition.

10. A solar reflecting panel as set forth in claim 9 wherein said frame separating devices each comprises a screw passing through an aperture in said outer frame member section at each of said locations and extending inwardly far enough to abut said inner frame member, and a nut threadedly engaged with said screw on the inner surface of said outer frame member section and held against rotation whereby said screw forcibly urges said inner frame member and said outer frame member section away from each other in response to rotation of said screw.

11. A solar reflecting panel as set forth in claim 10 wherein said frame separating devices further includes resilient means interposed between said screw and said outer frame member section to permit a limited amount of relative movement between said screw and said outer frame member section.

12. A solar reflecting panel as set forth in claim 11 wherein said resilient means comprises a generally U-shaped, elongate, pre-arched spring member which normally contacts said outer frame member section at least at spaced apart locations to distribute the load imposed by said screw.

13. A solar reflecting panel as set forth in claim 12 wherein said resilient means further includes a pre-arched spring member interposed between the inner end of said screw and said inner frame member which normally contacts the inner frame member at least at spaced apart locations to distribute the load imposed by said screw.

14. A solar reflecting panel as set forth in claim 9 wherein said tensioning frame further includes a plurality of frame separating devices located at the corner junctures of said outer frame member sections.

15. A solar reflecting panel as set forth in claim 14 wherein said corner juncture located frame separating devices each comprises the end edges of said outer frame member sections being mitered to define adjoining surfaces which are formed to define an aperture therebetween, and an expanding member inserted in said aperture and having means for forcibly urging the adjacent mitered surfaces away from each other as said expanding member is inserted further into said aperture.

16. A solar reflecting panel as set forth in claim 15 wherein said expanding member comprises a threaded bolt having an outwardly widening frusto-conical head which forces the adjacent outer frame member sections apart as said bolt is forced inwardly of said aperture.

17. A solar reflecting panel as set forth in claim 9 wherein said reflecting panel includes means for imposing a transverse bending force to said tensioning frame which is equal and opposite to the bending force applied to the tensioning frame by said reflecting member.

18. A solar reflecting panel as set forth in claim 17 wherein said means for imposing said transverse bending force comprises a second sheet of said base material which is substantially identical to said reflecting member.

19. A solar reflecting panel as set forth in claim 18 further including magnetic means suspended at the geometric center of said tensioning frame, said magnetic means being thinner than said inner frame member whereby said reflecting member is caused to take on a very slight degree of concavity to focus the rays of the sun on a receiver.

20. A solar reflecting panel as set forth in claim 9 wherein said frame separating devices each comprises a strut extending between said inner and outer frame members, the outer end of said strut abutting said outer frame member, and the inner end of said strut being connected to said inner frame member by means for forcibly urging said strut outwardly whereby said outer frame member is forcibly urged outwardly by said strut.

21. A solar reflecting panel as set forth in claim 20 wherein said means for forcibly urging said strut outwardly comprises a bolt passing through said inner frame member and being threadedly engaged with a nut disposed on the outer surface of said inner frame member and held against rotation, and an abutment means formed on said strut for abuting engagement by said bolt as said bolt is rotated relative to said nut.

22. A solar reflecting panel as set forth in claim 9 wherein said outer frame member sections each comprises an L-shaped angle beam, one leg of which lies in the plane of said reflecting member for holding said reflecting member, the other leg being disposed perpendicularly to said first leg for engagement by said frame separating devices.

23. A solar reflecting panel as set forth in claim 22 wherein said outer frame member section is provided with a plurality of interconnected curved portions defining spaced apart protrusions and depressions in the longitudinal configuration of both of said legs in the unstressed condition of said outer frame member, said protrusions and depressions formed in said outer frame member constituting a resilient means interposed between said reflecting member and said inner frame member to permit limited relative movement between said reflecting member and said inner frame member resulting from bending forces imposed on said reflecting panel.

24. A solar reflecting panel as set forth in claim 23 wherein the outer edge portion of said leg lying in the plane of said reflecting member is tapered on the surface thereof opposite to the surface ajdacent to said reflecting member thereby defining a relatively sharp edge over which a peripheral edge portion of said reflecting member to said outer frame member.

25. A solar reflecting panel as set forth in claim 23 wherein said frame separating devices comprise a plurality of struts extending between said inner and outer frame members around the periphery of said inner frame member, the outer end of each strut abutting said perpendicularly disposed leg of said outer frame member at one of said depressions formed in said outer frame member, the inner end of each strut being connected to said inner frame member by means for forcibly urging said strut outwardly whereby said outer frame member is forcibly urged outwardly initially at the locations of said depressions and ultimately along the entire length of said outer frame member as said outer frame member straightens in response to high stress applied at the locations of said depressions thereby distributing the load of said outer frame member substantially uniformly along the edge of said reflecting member.

* * * * *